(12) United States Patent
Massaro et al.

(10) Patent No.: US 7,499,839 B2
(45) Date of Patent: Mar. 3, 2009

(54) METHOD AND APPARATUS FOR IMPORTING DATA INTO PROGRAM CODE

(75) Inventors: Joseph Massaro, Mahopac, NY (US); David Derocher, Upton, MA (US); Dmitry Grinberg, Brooklyn, NY (US)

(73) Assignee: East Coast CAD/CAM, Littleton, MA (US)

( * ) Notice: Subject to any disclaimer, the term of this patent is extended or adjusted under 35 U.S.C. 154(b) by 0 days.

(21) Appl. No.: 11/238,626

(22) Filed: Sep. 29, 2005

(65) Prior Publication Data

US 2007/0168164 A1    Jul. 19, 2007

(51) Int. Cl.
G06F 17/50 (2006.01)
G06F 19/00 (2006.01)
G06Q 40/00 (2006.01)

(52) U.S. Cl. .............................. 703/1; 705/37; 700/97; 700/182

(58) Field of Classification Search .................. 703/1, 703/2, 6, 22; 705/1, 7, 8, 37, 54; 700/97, 700/182
See application file for complete search history.

(56) References Cited

U.S. PATENT DOCUMENTS

| | | | |
|---|---|---|---|
| 4,551,810 A * | 11/1985 | Levine | 700/182 |
| 4,554,635 A | 11/1985 | Levine | |
| 5,557,537 A * | 9/1996 | Normann et al. | 703/1 |
| 5,920,849 A * | 7/1999 | Broughton et al. | 705/400 |
| 6,618,856 B2 * | 9/2003 | Coburn et al. | 717/135 |
| 7,065,476 B2 * | 6/2006 | Dessureault et al. | 703/2 |
| 2002/0035408 A1 * | 3/2002 | Smith | 700/97 |
| 2005/0278670 A1 * | 12/2005 | Brooks et al. | 716/5 |
| 2007/0168164 A1 * | 7/2007 | Massaro et al. | 703/1 |

* cited by examiner

*Primary Examiner*—Paul L Rodriguez
*Assistant Examiner*—Dwin M Craig
(74) *Attorney, Agent, or Firm*—Frommer Lawrence & Haug LLP; John R. Lane

(57) ABSTRACT

The present invention relates to a method for designing a system. This method includes obtaining a visual representation of one or more components of the ventilation system. One or more property values are assigned to each of the components of the system, which may be achieved using first program code. Geometrical information representing the visual representation and the property values of each component are exported to a data file using the first program code. Standards information relating to the property values are stored. The data file is then imported into a second software application and the data file and the standards information is used to generate a final design using the second software application.

5 Claims, 4 Drawing Sheets

METHOD AND APPARATUS FOR IMPORTING DATA INTO PROGRAM CODE

BACKGROUND

1. Field of the Invention

This invention relates generally to computer aided design (CAD) and a method of importing data into a CAD system. More particularly, the present invention relates to utilizing CAD and design data to generate a representation of a system.

2. Background Discussion

CAD enables creation of a representation of design components. A CAD system is typically a combination of hardware components and software that enables engineers and architects to design virtually any article or component. In addition to the software, CAD systems utilize a high-quality graphics monitor; a mouse, light pen, or digitizing tablet for drawing; and a special printer or plotter for printing design specifications. CAD systems also allow an engineer to view a design from any angle and to zoom in or out for close-ups and long-distance views. In addition, the computer keeps track of design dependencies so that when the engineer changes one value, all other values that depend on it are automatically changed accordingly.

One conventional example of fabricating components, using a CAD program, is described in U.S. Pat. No. 4,554,635, which discloses a method and an apparatus for creating, laying out, and cutting patterns on laminar sheet material. The method and apparatus permits the automated creation of the patterns required to construct three-dimensional products such as fittings, which previously had only been designed by skilled technicians. Information representative of the geometric configuration of a group of basic patterns, including mathematical relationships, is stored in digital form in a memory, and from this information all variations of the three-dimensional product can be developed. This patent is hereby incorporated by reference in its entirety herein.

While the above-described system facilitates fabrication of components, it would be an advantage in the art to have a method for importing data parameters into a program code and applying standard information such as design specifications as well as specific data associated with a system.

BRIEF SUMMARY OF THE INVENTION

The present invention is directed toward a method and apparatus that enables importing data into program code. For example, the present invention enables the design of a fluid control system using parameter data and design data.

Accordingly, one embodiment of the present invention relates to a method for designing a ventilation system. This method includes obtaining a visual representation of one or more components of the ventilation system. Next one or more property values are assigned to each of the components of the ventilation system This assignment may be achieved using first program code. Geometrical information representing the visual representation and the property values of each component are exported to a data file using the first program code. Standards information relating to the property values are stored. The data file is then imported into a second software application. The data file and the standards information is used to generate a final design using the second software application.

Another embodiment of the present invention relates to a method of designing a fluid control system. This method includes obtaining a visual representation of one or more components of the system. One or more property values of the components of the system are established. The property values, the visual representation, and standards information are used to generate a final design.

Yet another embodiment of the present invention relates to an apparatus for designing a fluid control system, the apparatus comprising at least one memory and at least one processor, coupled to the at least one memory. The processor executes program code to assign one or more property values to each of a plurality of components of the system. Geometrical information corresponding to a visual representation of the design and the property values of each component are exported to a data file. Standards information relating to the property values is stored. The data file and the standards information to output a second visual representation of a final design.

Yet another embodiment of the present invention relates to a method for generating a blueprint to be used in the manufacturing of a fluid control system. The method comprises, obtaining a visual representation of one or more components of the system, and assigning one or more property values to each of the components of the system using first program code. Geometrical information representing the visual representation and the property values of each component are exported to a data file using the first program code. Standards information relating to the property values is stored. The data file is imported into a second software application. The data file and the standards information is used to generate a final design and parts list using the second software application.

DETAILED DESCRIPTION OF THE INVENTION

This invention provides a method and apparatus that imports data, such as design specifications, into program code that is used to generate a representation of desired components or parts. For example, the present invention can be used to provide information necessary for the fabrication of a fluid control system, the fluid control system may include any liquid, gas, or combination of liquid and gas movement. Such systems include, for example, a ventilation system, a plumbing system, a piping system, or a heating ventilation and air conditioning (HVAC) system.

An issue in manufacturing of three-dimensional parts, for example duct work of an HVAC system, is a requirement for a detailed diagram of each component or part. For example, the type of materials used, the pressure class, and further limiting factors specific to an installation environment are typical considerations. In the air conditioning and ventilation industries the ducting is designed to the specific dimensions of an architectural structure either under construction, renovation or improvement, and the ducts are tailored or custom designed for each project, particularly since the ducts generally must occupy the residual space and not encroach on the space required for plumbing and electrical lines.

Furthermore, the present invention enables a user to obtain design data, for example, ventilation, plumbing, piping, or HVAC design data and assign property values to each of the components of that system, including, for example, a pressure class and a material type. Geometrical information as well as the property values of the components of that system are then used in conjunction with stored standards information to generate a final design, including, for example a three-dimensional representation or a manufacturing blueprint. This design may be output to a printer, displayed on a graphical user interface, stored in memory, or transmitted to a remote device.

Furthermore, a user has the ability to import design data from a software program, or other information source, that is stored on the same user terminal or on a remote machine and use that design data with platform software.

Figure 1:
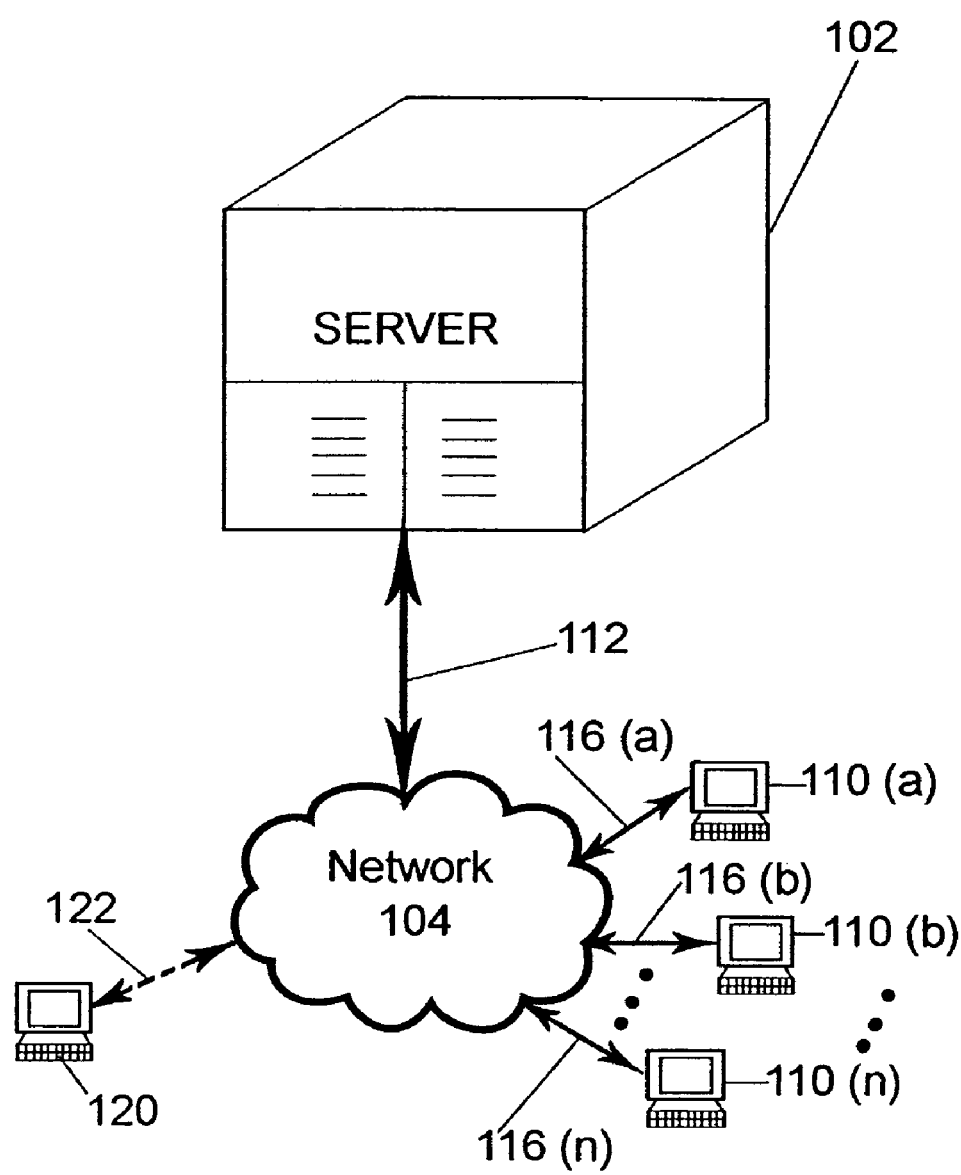
FIG. 1 shows a network environment adapted to support the present invention.

FIG. 1 shows a network environment 100 adapted to support the present invention. The exemplary environment 100 includes a network 104, a server 102, a plurality of communication appliances, or user locations, or subscriber devices, or client terminals, 110(a) . . . (n) (where "n" is any suitable number) (collectively referred to herein as, client terminals 110) and one or more remote client terminals, represented by terminal 120.

The network 104 is, for example, any combination of linked computers, or processing devices, adapted to transfer and process data. The network 104 may be private Internet Protocol (IP) networks, as well as public IP networks, such as the Internet that can utilize World Wide Web (www) browsing functionality.

Server 102 is operatively connected to network 104, via bi-directional communication channel, or interconnector, 112, which may be for example a serial bus such as IEEE 1394, or other wire or wireless transmission medium. The terms "operatively connected" and "operatively coupled", as used herein, mean that the elements so connected or coupled are adapted to transmit and/or receive data, or otherwise communicate. The transmission, reception or communication is between the particular elements, and may or may not include other intermediary elements. This connection/coupling may or may not involve additional transmission media, or components, and may be within a single module or device or between one or more remote modules or devices.

The server 102 is adapted to transmit data to, and receive data from, client terminals 110 and 120, via the network 104. Server 102 is described in more detail with reference to FIG. 2, herein.

Client terminals 110 and 120 are typically computers, or other processing devices such as a desktop computer, laptop computer, personal digital assistant (PDA), wireless handheld device, and the like. They may be capable of processing and storing data themselves or merely capable of accessing processed and stored data from another location (i.e., both thin and fat terminals). These client terminals 110, 120 are operatively connected to network 104, via bi-directional communication channels 116, 122, respectively, which may be for example a serial bus such as IEEE 1394, or other wire or wireless transmission medium. Client terminals 110, 120 are described in more detail in relation to FIG. 3.

The server 102 and client terminals 110, 120 typically utilize a network service provider, such as an Internet Service Provider (ISP) or Application Service Provider (ASP) (ISP and ASP are not shown) to access resources of the network 104.

Figure 2:
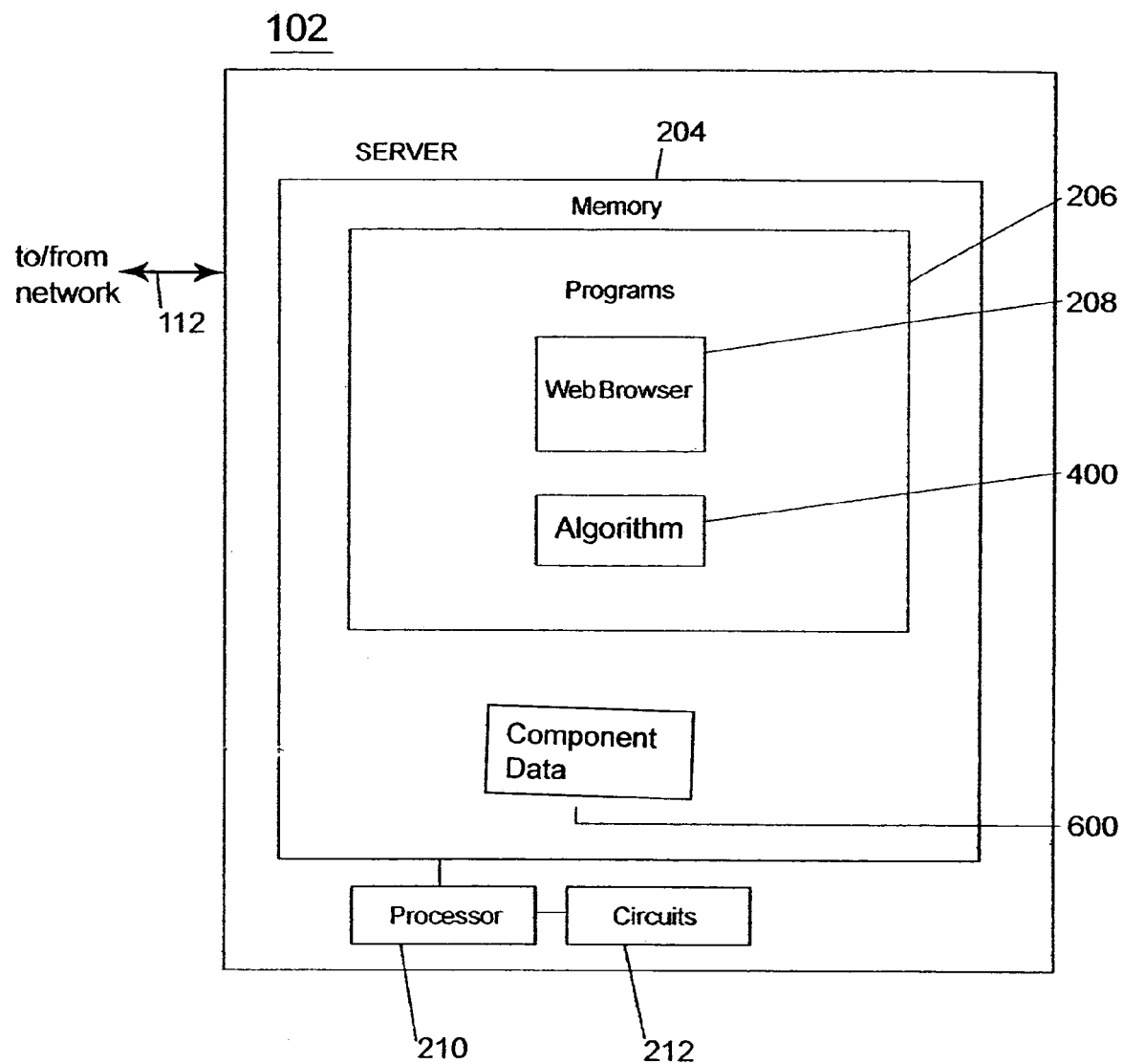
FIG. 2 illustrates a processing apparatus adapted to store and process data related to the present invention.

FIG. 2 illustrates that server 102, which is adapted to store and process data related to the present invention, is operatively connected to the network (shown as 104 in FIG. 1), via interconnector 112. Server 102 includes a memory 204, processor 210 and circuits 212.

Memory 204 stores programs 206, which include, for example, a web browser 208, an algorithm 400, as well as typical operating system programs (not shown), input/output programs (not shown), and other programs that facilitate operation of server 102. Web browser 208 is for example an Internet browser program such as Explorer™. Algorithm 400 is a series of steps for generating a final design, which is typically stored on a computer-readable memory and executed by a processor. The generating process utilizes component data and standards information. These functions may be implemented or facilitated by using software, such as EC-CAD™, Autodesk™ Building Systems, or other program code or software. This algorithm 400 is discussed in more detail in relation to FIG. 4.

Memory 204 also stores data tables 600. Data table 600 is a database or memory location adapted to store related data, which can be retrieved, processed, updated, modified or otherwise manipulated.

Data table 600 is adapted to store component data related to a visual representation. This input is typically obtained from a user through the use of a Computer Aided Design program or platform software, for example, EC-CAD™, Autodesk™ Building Systems, or other program code.

Processor 210, which is operatively connected to memory 204, is used to process and manipulate the data retrieved and stored by server 102. The processor 210 is typically a microprocessor with sufficient speed and processing capacity to adequately perform the desired data manipulations of server 102. Circuits 212 are operatively connected to processor 210 and typically include, for example, Integrated Circuits (ICs), ASICs (application specific ICs) power supplies, clock circuits, cache memory and the like, as well as other circuit components that assist in executing the software routines stored in the memory 204 and that facilitate the operation of processor 210.

Figure 3:
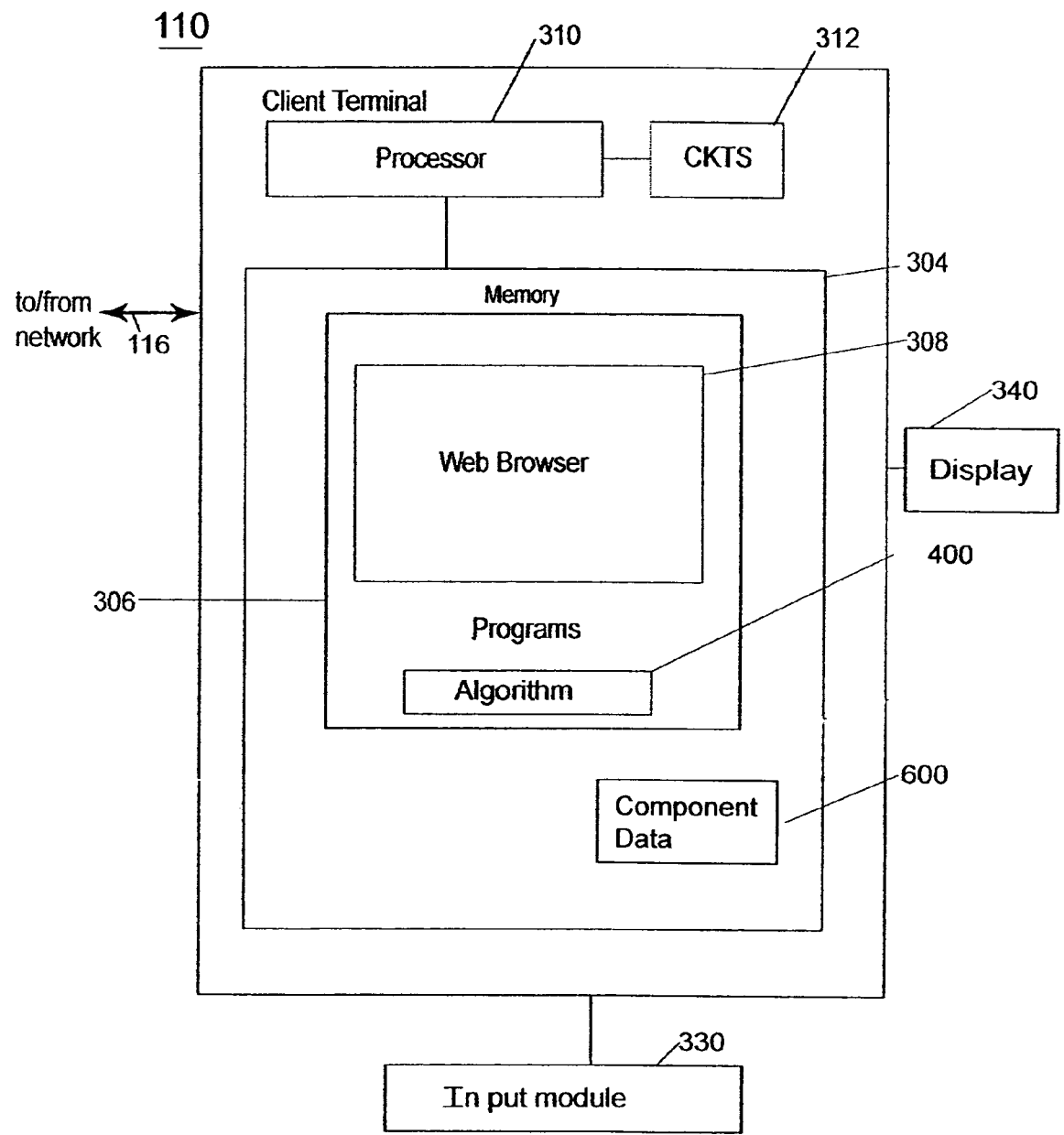
FIG. 3 illustrates a communication appliance shown in FIG. 1.

FIG. 3 illustrates subscriber terminal, also referred to herein as a client terminal, user terminal, or communication appliance 110. Terminal 110 is typically a desktop computer, laptop computer, PDA (personal digital assistant), wireless handheld device, mobile phone or other device capable of interfacing with a network, such as an IP network. Terminal 110 includes processor 310, support circuitry 312, memory 304, input module 330 and display module 340. Bi-directional interconnection medium 116 operatively connects the terminal 110 to the network (shown as element 104 in FIG. 1). The user terminal is typically located at the user location.

Processor 310, which is operatively connected to memory 304, is used to process and manipulate the data retrieved and stored by terminal 110. The processor is typically a microprocessor with sufficient speed and processing capacity. The processor 310 is operatively connected to circuitry 312. Circuitry 312 typically includes, for example, Integrated Circuits (ICs), ASICs (application specific ICs) power supplies, clock circuits, cache memory and the like, as well as other circuit components that assist in executing the software routines stored in the memory 304 and that facilitate the operation of processor 310.

Memory 304 stores programs 306, which include, for example, a web browser 308 as well as typical operating system programs (not shown), input/output programs (not shown), and other programs that facilitate operation of terminal 110. Web browser 308 is for example an Internet browser program such as Explorer™. Algorithm 400 is a series of steps, typically executed by a processor such as, for example, processor 310, to manipulate selected image data from the client terminal. This algorithm 400 is discussed in more detail in relation to FIG. 4.

Memory 304 also stores data table 600. Data table 600 is a database or memory location adapted to store component data, which can be retrieved, processed, updated, modified or otherwise manipulated. Component data is a function of a visual representation. This input is typically obtained from a user through the use of a Computer Aided Design program or platform software, for example, EC-CAD™, Autodesk™ Building Systems.

Data table 600 is adapted to store component data related to design data. This input is typically obtained when a user positions a mouse, or provides one or more keystrokes, or other selection means on a portion of image data, which may include a mark-up language. The mark-up language may be, for example, hypertext mark-up language (HTML) or extensible mark-up language (XML).

Input module 330 is, for example, a keyboard, mouse, touch pad, menu having soft-keys, or any combination of such elements, or other input facility adapted to provide input to terminal 110.

Display module 340 is, for example, a monitor, LCD (liquid crystal display) display, GUI (graphical user interface) or other interface facility that is adapted to provide or display information to a user.

Generally, the apparatus, system and method of the present invention are achieved in several steps.

Figure 4:
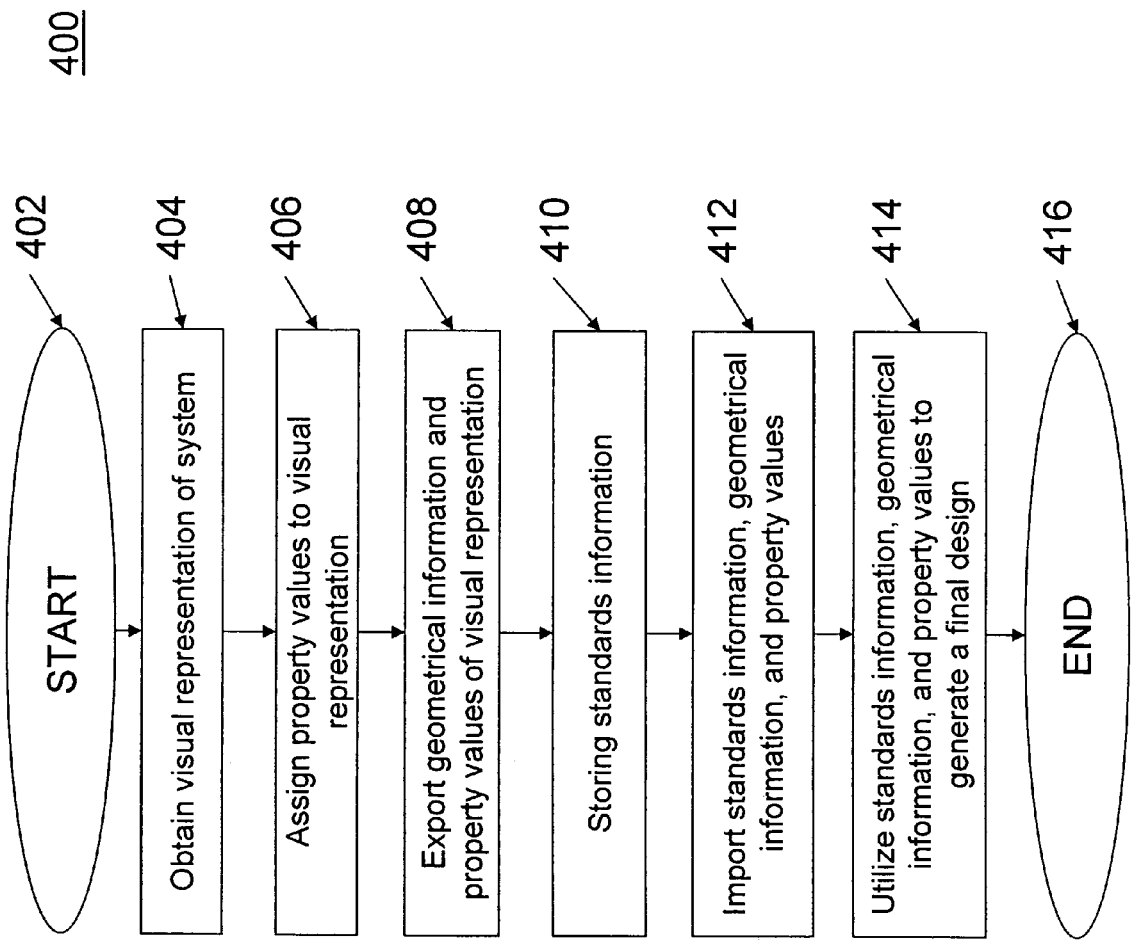
FIG. 4 is an algorithm to implement the present invention.

As shown in FIG. 4, algorithm 400 is a series of steps, typically stored on a computer-readable medium that may be executed at a server, or other processing device to implement the present invention. As shown in FIG. 4, step 402 begins execution of the algorithm.

A user obtains a visual representation of one or more components of a system, as shown in step 404. The visual representation may be, for example, .dwg, or a .dxf, and may include a plurality of layers. The visual representation of the system could be, for example, a plumbing system, an HVAC system, a ventilation system, a general fluid control system, or any system that has components designed to particular specifications. The visual representation is designed in an existing software application, for example Autodesk™ Building Systems or EC-CAD, and may show any number of components. The design of the system may be obtained from a remote system over a network or from the memory of the current user terminal. If from a remote system, the design is typically from a user terminal, web page, network device or other source of data, and is typically transmitted over a network.

In step 406, property values are assigned to components of the system that has been obtained. Property values that are assigned include, for example, a pressure class, a material type, airflow direction, and a component manufacturer. The assignment of property values may be made, for example, when a user positions a mouse, or provides one or more keystrokes. The components may be selected for assignment when, for example, a user chooses "all fittings", a rectangular area, or a specific duct run or duct runs. For example, a contractor can select a duct run, assign a property value of galvanized metal to material type, and assign that the selected duct will be at a 2" water gauge pressure class. The assigned property values are saved in association with the duct run.

Geometrical information of the design and the assigned property values are exported to a data file, as shown in step 408. The geometrical information that exists for each component of the design may include centerline coordinates, inlet coordinates, outlet coordinates, and orientation of the fitting. A user's desire to export the design is made, for example, via a menu item or toolbar for example. The selection of components may be made via individual mouse selections. For example, a user may choose "all fittings", a rectangular area, or a specific duct run or duct runs.

The user can then choose a name and location of the data file that the geometrical information and property value data are to be exported to and saved therein, as shown in step 410. The data file may be any proprietary or non-proprietary format, for example, .txt (text), xml (extensible mark up language), or IFC (Industry Foundation Classes).

In another embodiment, after the selection is made, components without assigned property values that are selected can then be assigned property values. The selection process then continues until property values have been assigned to each component in the selection.

In step 412, standards information that is stored in step 410 is imported into a second software application, for example EC-CAD™ or EC-CAM™. The stored standards information is used to assign standard fittings to the geometrical information. Additionally, the geometrical information and the property values are imported.

This standards information may be stored at an earlier time, downloaded, retrieved, processed, updated, modified or otherwise manipulated.

The standards information includes information that allows non-standard fittings to be mapped to standard fittings. This information includes, for example, rules and tables, dependent on the property values, which are applied to the imported geometrical information. For example, in an HVAC system, information relating to standard duct lengths, connectors, gauges, locks, seams, stiffeners, reinforcement, and gaps are applied to the imported geometrical information.

In another fabricated system, the standards apply to the related components, functions, or parts of the system.

Thus, in step 414, the second software program generates an output. For example, a three-dimensional representation of the intended system that looks substantially identical to the original three-dimensional representation may be generated. The difference being that the second three-dimensional representation is a representation constructed of standard fittings.

The standards information may also include fabrication information of standard fittings. The fabrication information is typically a function of the fittings themselves and the property values of each of the standard fittings.

In another embodiment, the standards information may be applied to create a blueprint of the final design.

In yet another embodiment, the standards information may be applied to create a parts list, or a financial estimate. For example, totals of the number of each part necessary for the fabrication of the system can be generated. Further, for example, a total square footage, a total poundage, a total fabrication hours, or a total cost may be generated by applying the standards information to the imported geometrical information and property values.

The second visual representation is adjustable at this point also. A user has the ability to add, remove, or replace fittings, duct lengths, and/or property values. Upon making the changes, the software program makes the necessary dependent changes to the design. For example, an updated blueprint, an updated three-dimensional representation, or an updated parts list may be necessary and can be generated.

The algorithm ends, as shown in step 416.

Thus, while fundamental novel features of the invention shown and described and pointed out, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in another form or embodiment. It is the intention, therefore, to be limited only as indicated by the scope of the claims appended hereto.

What is claimed is:

1. A computer-readable medium having computer executable instructions for designing a ventilation system that when executed by a processor performs the following steps comprising:

obtaining a visual representation of one or more components of the ventilation system;

assigning one or more property values to each of the components of said ventilation system using a first program code;

exporting geometrical information representing said visual representation and said property values of each component to a data file using the first program code;

importing said data file into a second software application; and using the second software application for:

mapping all components of the imported geometrical information to a plurality of standard fittings as a function of: (1) standards information including (1A) information specific to each of the plurality of standard fittings and (1B) fabrication information of each of the plurality of specific standard fittings: (2) the imported geometrical information; and (3) the assigned property values; and generating a manufacturing blueprint comprising:

the standard fittings;

the fabrication information; and a three-dimensional representation of the visual representation, whereby each of the one or more components of the visual representation have been mapped to standard fittings and include fabrication information in the manufacturing blueprint, thus, eliminating a need to redraw every component of an architectural drawing before coordination, fabrication, and installation of the system.

2. A computer-readable medium having computer executable instructions for designing a ventilation system according to claim 1 that when executed by a processor performs the steps further comprising:

wherein said property values include a pressure class, a material type, an airflow direction, or a component manufacturer.

3. A computer-readable medium having computer executable instructions for designing a fluid control system that when executed by a processor performs the following steps comprising:

obtaining a visual representation of one or more components of the ventilation system;

assigning one or more property values to each of the components of said ventilation system using a first program code;

exporting geometrical information representing said visual representation and said property values of each component to a data file using the first program code;

importing said data file into a second software application; and using the second software application for:

mapping all components of the imported geometrical information to a plurality of standard fittings as a function of: (1) standards information including (1A) information specific to each of the plurality of standard fittings and (1B) fabrication information of each of the plurality of specific standard fittings; (2) the imported geometrical information; and (3) the assigned property values; and generating a manufacturing blueprint comprising:

the standard fittings;

the fabrication information; and a three-dimensional representation of the visual representation, whereby each of the one or more components of the visual representation have been mapped to standard fittings and include fabrication information in the manufacturing blueprint, thus, eliminating a need to redraw every component of an architectural drawing before coordination, fabrication, and installation of the system.

4. A computer-readable medium having computer executable instructions for designing a fluid control system that when executed by a processor performs the following steps comprising:

obtaining a visual representation of one or more components of the system;

assigning one or more property values to the components of said system;

exporting geometrical information representing said visual representation to a data file using the first program code;

exporting said property values of each component to the data file using the first program code;

importing said data file into a second software application; and using the second software application for:

mapping all components of the imported geometrical information to a plurality of standard fittings as a function of: (1) standards information including (1A) information specific to each of the plurality of standard fittings and (1B) fabrication information of each of the plurality of specific standard fittings; (2) the imported geometrical information; and (3) the assigned property values; and generating a manufacturing blueprint comprising:

the standard fittings;

the fabrication information; and a three-dimensional representation of the visual representation, whereby each of the one or more components of the visual representation have been mapped to standard fittings and include fabrication information in the manufacturing blueprint, thus, eliminating a need to redraw every component of an architectural drawing before coordination, fabrication, and installation of the system.

5. A computer-readable medium having computer executable instructions for generating a blueprint to be used in the manufacturing of a fluid control system that when executed by a processor performs the following steps comprising:

instructions to assign one or more property values to each of a plurality of components of said system;

instructions to export geometrical information representing said visual representation to a data file using the first program code;

instructions to export said property values of each component to the data file using the first program code;

instructions to import said data file into a second software application; and instructions to use the second software application for:

mapping all components of the imported geometrical information to a plurality of standard fittings as a function of: (1) standards information including (1A) information specific to each of the plurality of standard fittings and (1B) fabrication information of each of the plurality of specific standard fittings; (2) the imported geometrical information; and (3) the assigned property values; and generating a manufacturing blueprint comprising:

the standard fittings;

the fabrication information; and a three-dimensional representation of the visual representation, whereby each of the one or more components of the visual representation have been mapped to standard fittings and include fabrication information in the manufacturing blueprint, thus, eliminating a need to redraw every component of an architectural drawing before coordination, fabrication, and installation of the system.

* * * * *